United States Patent
Namarvar et al.

(10) Patent No.: US 11,029,096 B2
(45) Date of Patent: Jun. 8, 2021

(54) HEAT EXCHANGER FOR QUENCHING REACTION GAS

(71) Applicant: TECHNIP FRANCE, Courbevoie (FR)

(72) Inventors: Esmaeil Mahmoudi Namarvar, Courbevoie (FR); Peter Oud, Courbevoie (FR)

(73) Assignee: TECHNIP FRANCE, Courbevoie (FR)

( * ) Notice: Subject to any disclaimer, the term of this patent is extended or adjusted under 35 U.S.C. 154(b) by 340 days.

(21) Appl. No.: 16/316,301

(22) PCT Filed: Jul. 5, 2017

(86) PCT No.: PCT/EP2017/066790
§ 371 (c)(1),
(2) Date: Jan. 8, 2019

(87) PCT Pub. No.: WO2018/007452
PCT Pub. Date: Jan. 11, 2018

(65) Prior Publication Data
US 2020/0103173 A1 Apr. 2, 2020

(30) Foreign Application Priority Data
Jul. 8, 2016 (EP) .................................... 16178736

(51) Int. Cl.
*F28F 19/00* (2006.01)
*F28D 7/10* (2006.01)
(Continued)

(52) U.S. Cl.
CPC .............. *F28D 7/106* (2013.01); *F28F 1/003* (2013.01); *F16L 9/18* (2013.01); *F16L 2201/30* (2013.01);
(Continued)

(58) Field of Classification Search
CPC .. F28D 7/106; F28D 2021/0075; F28F 1/003; F28F 9/02; F28F 2265/26; F16L 9/18; F16L 2201/30
(Continued)

(56) References Cited

U.S. PATENT DOCUMENTS

| 5,579,831 A | 12/1996 | Brucher |
| 5,732,981 A | 3/1998 | Brucher et al. |

(Continued)

FOREIGN PATENT DOCUMENTS

| DE | 19707915 A1 | 9/1998 |
| EP | 0219155 A2 | 4/1987 |

(Continued)

OTHER PUBLICATIONS

First Examination Report issued in corresponding Canadian Application No. 3,030,207 dated Dec. 11, 2019.
(Continued)

*Primary Examiner* — Davis D Hwu
(74) *Attorney, Agent, or Firm* — Locke Lord LLP; Alan B. Clement

(57) ABSTRACT

Heat exchanger for quenching reaction gas comprising—a coolable double-wall tube including an inner tubular wall and an outer tubular wall, wherein said inner tubular wall is configured to convey said reaction gas to be quenched, and wherein a space defined by said inner tubular wall and said outer tubular wall is configured to convey a coolant; —a tubular connection member having a bifurcating longitudinal cross-section comprising an exterior wall section and an interior wall section defining an intermediate space filled with refractory filler material, wherein a converging end of said connection member is arranged to be in connection with an uncoolable reaction gas conveying pipe, wherein said exterior wall section is connected with said outer tubular (Continued)

wall of said coolable double-wall tube, wherein an axial gap is left between said interior wall section and said inner tubular wall of said coolable double-wall tube.

27 Claims, 3 Drawing Sheets

(51) Int. Cl.
*F28F 1/00* (2006.01)
*F16L 9/18* (2006.01)
*F28D 21/00* (2006.01)
*F28F 9/02* (2006.01)

(52) U.S. Cl.
CPC ........ *F28D 2021/0075* (2013.01); *F28F 9/02* (2013.01); *F28F 2265/26* (2013.01)

(58) Field of Classification Search
USPC ..................................................... 165/134.1
See application file for complete search history.

(56) References Cited

U.S. PATENT DOCUMENTS

| 9,074,821 | B2 | 7/2015 | Birk et al. | |
| 2010/0319888 | A1 | 12/2010 | Birk et al. | |
| 2012/0222845 | A1* | 9/2012 | Kinder | F28F 13/12 |
| | | | | 165/154 |
| 2017/0030652 | A1* | 2/2017 | Penny | F28D 21/0003 |

FOREIGN PATENT DOCUMENTS

| JP | H058251 | U | 2/1993 |
| JP | H9189384 | A | 7/1997 |
| JP | 2000-320677 | A | 11/2000 |
| JP | 2002310564 | A | 10/2002 |
| JP | 200991948 | A | 4/2009 |
| JP | 2011-2222 | A | 1/2011 |
| KR | 20100135668 | A | 12/2010 |

OTHER PUBLICATIONS

Response to First Examination Report filed in corresponding Canadian Application No. 3,030,207 dated Apr. 14, 2020.
First Examination Report issued in corresponding Indian Application No. 201947004477 dated Nov. 22, 2019.
Response to First Examination Report filed in corresponding Indian Application No. 201947004477 dated Apr. 30, 2020.
First Examination Report issued in corresponding Japanese Application No. 2019-500388 dated Feb. 26, 2020.
First Examination Report issued in corresponding Korean Patent Application No. 10-2019-7003845 dated Apr. 17, 2020.
International Search Report and Written Opinion of the Searching Authority for International Patent Application No. PCT/EP2017/066790 dated Nov. 20, 2017.
Office Action issued in corresponding Indian application No. 202048018478, dated Nov. 5, 2020.

* cited by examiner

HEAT EXCHANGER FOR QUENCHING REACTION GAS

CROSS-REFERENCE TO RELATED APPLICATIONS

This Application is a U.S. National Stage application under 35 U.S.C. 371 of International Application No. PCT/EP2017/066790 filed Jul. 5, 2017, which claims the benefit of and priority to European Patent Application No. 16178736.1 filed on Jul. 8, 2016. The contents of these above referenced patent applications are hereby incorporated by reference in their entirety.

The invention relates to a heat exchanger for quenching reaction gas.

Such a device is generally known, and may for example be found on a cracking furnace of an ethylene production plant, where it is used to quickly cool down cracked gas, in order to avoid secondary reactions. A heat exchanger for quenching reaction gas generally comprises

- a coolable double-wall tube including an inner tubular wall and an outer tubular wall, wherein said inner tubular wall is configured to convey said reaction gas to be quenched, and wherein a space defined by said inner tubular wall and said outer tubular wall is configured to convey a coolant;
- a tubular connection member having a bifurcating longitudinal cross-section comprising an exterior wall section and an interior wall section defining an intermediate space filled with refractory filler material, wherein a converging end of said connection member is arranged to be in connection with an uncoolable reaction gas conveying pipe, wherein said exterior wall section is connected with said outer tubular wall of said coolable double-wall tube, wherein an axial gap is left between said interior wall section and said inner tubular wall of said coolable double-wall tube;
- a sealing member configured to seal said axial gap between said interior wall section and said inner tubular wall of said coolable double-wall tube.

Examples of such heat exchangers can be found for instance in document U.S. Pat. No. 5,732,981 disclosing a joint between a hot unrefrigerated pipe and a refrigerated pipe, with the end of the unrefrigerated pipe bifurcating in cross-section, and including a flexible component, an O-ring for instance, between, and resting tight against, the face of the refrigerated pipe and that of the interior section of the unrefrigerated pipe. However, a disadvantage of this prior art device is that the sealing member may get damaged, as the sealing member may get crushed when an interior wall section of said tubular connection member axially expands due to the passage of hot reaction gas. Without proper sealing, hot reaction gas may leak into the intermediate space filled with refractory filler material, which may get damaged in this way as well.

US 2010/0319888 discloses another example of a prior art heat exchanger for cooling reaction gas. In an attempt to better protect the sealing member, the sealing member cannot be reached anymore from an inner side of the tubular connection member, which seriously complicates exchange of said sealing member in case such an exchange turns out to be necessary, for example in case of wear after a certain time.

Another problem with these prior art heat exchangers is that said refractory filler material may get damaged or crushed due to the difference in thermal expansion between the interior wall section and the exterior wall section of said tubular connection member.

A further problem lies in the lack of efficient flow of coolant in the space defined by said inner tubular wall and said outer tubular wall of said coolable double-wall tube.

It is an aim of the present invention to solve or alleviate one or more of the above-mentioned problems. Particularly, a first aspect of the invention aims at providing an improved heat exchanger for quenching reaction gas, which provides an effective sealing of the refractory filler material during the different temperature ranges of all stages of the process. It is another aim of the invention to provide a heat exchanger, which can be repaired efficiently in case of need. A second aspect of the invention aims at providing an improved heat exchanger for quenching reaction gas, which provides a compensation for the difference in thermal expansion between the interior wall section and the exterior wall section of said tubular connection member. A third aspect of the invention aims at providing an improved heat exchanger for quenching reaction gas, which can provide an efficient flow of coolant in said space defined by said inner tubular wall and said outer tubular wall of said coolable double-wall tube.

To these aims, according to a first aspect of the present invention, there is provided a heat exchanger for quenching reaction gas characterized by the features of claim 1. In particular, an edge of said inner tubular wall engaging said sealing member comprises an at least partly bevelled edge including a bevel engaging said sealing member. As the sealing member engages a bevel of an at least partly bevelled edge of said inner tubular wall, the sealing member can be gradually shifted along said bevel during axial thermal expansion of said interior wall section of said tubular connection member, thus partially compensating the thermal expansion difference between said interior wall section and said exterior wall section of said tubular connection member. In this way, crushing of said sealing member between an edge of said inner tubular wall and an axially expanding interior wall section of said tubular connection member can be avoided.

In a preferred embodiment, said sealing member may comprise slidingly overlapping thinned ends. When joining said slidingly overlapping thinned ends, a ring-like sealing member can be formed. Due to the axially limited space between said inner tubular wall and said interior wall section of said tubular connection member, where the sealing member is located, thermal expansion of said sealing member will in particular result in circumferential expansion of said sealing member, which can be compensated by said slidingly overlapping thinned ends so that good sealing can be obtained at different temperature ranges, in a more efficient way than with a closed loop sealing member. At the same time, said slidingly overlapping thinned ends can also compensate for a slight change in diameter of said ring-like sealing member due to a gradual shift of said sealing member along said bevel during axial thermal expansion of said interior wall section of said tubular connection member.

Advantageously, said sealing member can comprise a spring-like element arranged to press said sealing member against said at least partly bevelled edge of said inner tubular wall. Elasticity of said spring-like element can ensure a good sealing at all temperature ranges. In particular, said spring-like element can ensure that the sealing member quickly returns to its original shape during shutdown, which is accompanied by a sudden drop in temperature.

In a more preferred embodiment, said edge of said inner tubular wall may be bevelled radially inwardly. Such a radially inward beveling has the advantage that the sealing member can be located at a location which can be reached from an inner side of said tubular connection member, thus facilitating maintenance in case it is needed. Alternatively, said edge of said inner tubular wall may also be bevelled radially outwardly.

In a still more preferred embodiment, an edge of said interior wall section engaging said sealing member may comprise a partly bevelled edge including a bevel radially spaced apart from, and substantially in parallel with, said at least partly bevelled edge of said end side of said inner tubular wall. During thermal expansion of said interior wall section, said interior wall section, in particular said bevel, may expand both radially and axially, and thus engage said at least partly bevelled edge of said end side of said inner tubular wall forming a second seal between an inner side of said tubular connection member and said intermediate space filled with refractory filler material. It will be clear to the person skilled in the art that the radial and/or axial spacing apart of both bevels is preferably smaller than or equal to a maximal thermal expansion difference of said tubular connection member.

Said sealing member may preferably engage an unbevelled part of said partly bevelled edge of said interior wall section of said tubular connection member. As the sealing member is thus engaged on one axial side by a bevel of an at least partly bevelled edge of said inner tubular wall, and on the other axial side by an unbevelled part of said partly bevelled edge of said interior wall section of said tubular connection member, the unbevelled part allows for a relatively free and easy radial shift of said sealing member during axial thermal expansion of said interior wall section of said tubular connection member, while maintaining a relatively good support of said sealing member on said unbevelled part of said partly bevelled edge of said interior wall section of said tubular connection member.

In an advantageous embodiment, said refractory filler material may comprise at least two sectors of refractory filler material separated by at least two slits extending in an axial and a radial direction. Said at least two slits can absorb thermal expansion of said refractory filler material in a circumferential direction, in order to avoid damage of said refractory filler material, which might get crushed between a radially more expanding interior wall section of said tubular connection member and a radially less expanding exterior wall section of said tubular connection member, the difference in expansion being due to the difference in proximity to the hot reaction gas. The refractory filler material may be equally divided, for example in two sectors of 180°, or for example in three sectors of 120°, or may be divided into uneven sectors. This feature may even be considered as an invention in itself.

In a more advantageous embodiment, said at least two slits can comprise a layer of ceramic paper, which is well known for its high temperature application. Said layer of ceramic paper, which is a relatively soft filler material, can absorb thermal expansion differences in a circumferential direction between said interior and exterior wall section of said tubular connection member. Alternatively, said at least two slits may comprise a laminar ceramic material.

It is preferred that a layer of ceramic paper is comprised between said refractory filler material and said exterior wall section of said tubular connection member. A thickness of said layer may be chosen in function of an adequate compensation for the radial thermal expansion difference between said interior and exterior wall section of said tubular connection member. As an alternative, said layer of ceramic paper may be substituted by an ash-free thermo-degradable polymer material, which will be gasified during a refractory dry-out process.

Said refractory filler material may in an axial direction preferably comprise at least two layers of refractory filler material with different heat conductivity, wherein the heat conductivity of said at least two layers of refractory filler material decreases towards said coolable double-wall tube. In this way, heat insulation increases towards the coolable double-wall pipe, while stress on the converging end of the tubular connection member can be reduced.

In a preferred embodiment, said outer tubular wall of said coolable double-wall tube is at least partly made of manganese and/or molybdenum. The use of one or both of these materials allows the possibility of a decrease in thickness, and an increase in length, of said outer tubular wall, which results in a reduction of axial compression of said inner tubular wall due to the thermal expansion difference between said inner and outer tubular wall of said coolable double-wall tube. Alternatively, carbon steel may also be used for said outer tubular wall of said coolable double-wall tube, or any other suitable material known to the person skilled in the art.

In an advantageous embodiment, said coolable double-wall tube comprises a coolant inlet nozzle arranged to let a coolant into said space defined by said inner tubular wall and said outer tubular wall of said coolable double-wall tube at a lower end side of said coolable double-wall tube close to said tubular connection member. In this way, the coolant enters into the double-wall tube at a level where the hot gas inside said inner tubular wall still has the highest temperature and needs most coolant.

In a more advantageous embodiment, said coolant inlet nozzle is included in a coolant box extending between said outer tubular wall of said coolable double-wall tube and said exterior wall section of said tubular connection member and surrounding said inner tubular wall of said coolable double-wall tube. Insertion of a coolant box between said coolable double-wall tube and said tubular connection member allows a relatively easy adaptation of that part to the structural constraints linked with the coolant inlet nozzle, which requires for example a thicker outer tubular wall. Alternatively, said outer tubular wall of said coolable double-wall tube could be directly provided with a coolant inlet nozzle.

The heat exchanger may preferably comprise at least one baffle arranged to guide a flow of coolant in said space defined by said inner tubular wall and said outer tubular wall of said coolable double-wall tube. Such a baffle can improve the effect of cooling by regulating the flow of coolant. Moreover, a baffle can prevent stagnation of the flow of coolant and can prevent under deposit corrosion in a bottom level of the coolable double-wall tube on an opposite side of said coolant inlet nozzle. Under deposit corrosion occurs if salts present in low quantities in the coolant are allowed to settle. If the area on which it settles is subject to heat flux, the coolant, for example water, will evaporate, leaving the salts behind. These highly concentrated salts attack the surface of the water space underneath the deposit.

Said at least one baffle may preferably be fixedly connected with an outside of said inner tubular wall of said coolable double-wall tube. In this way, said at least one baffle is located within the annular space conveying coolant between said inner and outer tubular wall of said coolable double-wall tube, providing an efficient flow of coolant around said inner tubular wall.) Alternatively, said at least one baffle may also be fixed to an outer tubular wall of said coolable double-wall tube or to a wall of said coolant box, in particular to a wall of said coolant inlet nozzle.

In a preferred embodiment, at least one baffle may extend into a direction of said coolant inlet nozzle. This at least one baffle can help separating and directing the flow of coolant coming in from said coolant inlet nozzle around the lower end side of said inner tubular wall of the coolable double-wall tube close to said tubular connection member. In an alternative way, said at least one baffle may also be positioned at another position in said annular space defined by said inner tubular wall and said outer tubular wall of said double-wall tube, for example just above said coolant inlet nozzle of said coolant box.

It is an advantage that said at least one baffle is off-centered with respect to a central axis of said coolant inlet nozzle. In this way, an uneven swirl around said inner tubular wall of said double-wall tube can be created improving the cooling effect.

In a more advantageous embodiment, said heat exchanger may comprise at least two mutually transversally positioned baffles such that the flow of said incoming coolant is directed in two transverse directions, increasing a swirling effect of the coolant flowing around said inner tubular wall of said double-wall tube.

According to a second aspect of the invention, there is provided a heat exchanger for quenching reaction gas characterized by the features of claim 19. Such a heat exchanger may provide one or more of the above-mentioned advantages.

According to a third aspect of the invention, there is provided a heat exchanger for quenching reaction gas characterized by the features of claim 22. Such a heat exchanger may provide one or more of the above-mentioned advantages.

The present invention will be further elucidated with reference to figures of exemplary embodiments. Corresponding elements are designated with corresponding reference signs.

Figure 1:
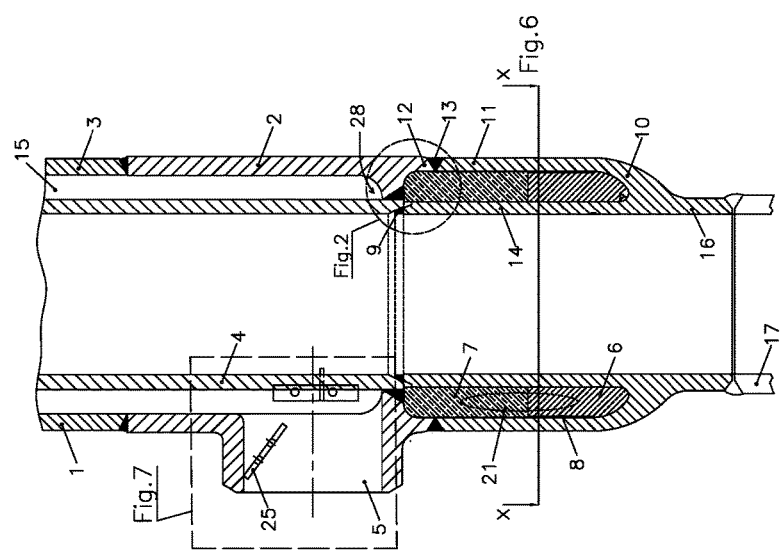
FIG. 1 shows a longitudinal cross-sectional view of a preferred embodiment of a heat exchanger according to the invention.

FIG. 1 shows a longitudinal cross-sectional view of a preferred embodiment of a heat exchanger according to the invention. The heat exchanger comprises a coolable double-wall tube 1 including an inner tubular wall 4 and an outer tubular wall 3. Said inner tubular wall 4 is configured to convey said reaction gas to be quenched or coolable. A space 15 defined by said inner tubular wall 4 and said outer tubular wall 3 is configured to convey a coolant, for example water. Said outer tubular wall 3 of said coolable double-wall tube 1 may for example at least partly be made of manganese and/or molybdene, or of carbon steel or of any other suitable material known to the person skilled in the art. The outer tubular wall 3 may have a wall thickness in a range of for example 5-20 mm. The outer diameter of said coolable double-wall tube may for example be comprised in a range of 100-200 mm. Said inner tubular 4, having a thickness of for example 5-14 mm, may for example be made of a steel alloy, for example of 0.5Mo or 1.25Cr-0.5Mo, or of any other suitable material. An outer diameter of an inner tube defined by said inner tubular wall 4 of said double-wall tube 1 may for example be comprised in a range of 60-140 mm. The heat exchanger further comprises a tubular connection member 10 having a bifurcating longitudinal cross-section comprising an exterior wall section 11 and an interior wall section 14 defining an intermediate space 21 filled with refractory filler material 6, 7. Said tubular connection member may for example at least partly be made of a steel alloy, for example of 25Cr-35NiNb or of any other suitable material known to the skilled person. A thickness of the exterior wall section 11 and of the interior wall section 14 can for example be comprised in a range of 7-14 mm. A converging end 16 of said connection member 10 is arranged to be in connection with an uncoolable reaction gas conveying pipe 17. Said converging end 16 may for example be welded 13 to said gas conveying pipe 17, or connected otherwise. The exterior wall section 11 is connected with said outer tubular wall 3 of said coolable double-wall tube 1, for example directly via a weld, or for example indirectly via an intermediate coolant box 2 as in FIG. 1. An internal diameter of said connection member 10 can be equal to, or slightly (<2 mm) smaller than, an internal diameter of an inner tube defined by said inner tubular wall 4 of said double-wall tube 1. An axial gap 27 is left between said interior wall section 14 and said inner tubular wall 4 of said coolable double-wall tube 1. The heat exchanger also includes a sealing member 9 configured to seal said axial gap 27 between said interior wall section 14 and said inner tubular wall 4 of said coolable double-wall tube 1. The coolable double-wall tube 1 of the heat exchanger can further include a coolant inlet nozzle 5 arranged to let a coolant into said space defined by said inner tubular wall 4 and said outer tubular wall 3 of said coolable double-wall tube 1 at a bottom level of said coolable double-wall tube 1 close to said tubular connection member. The inlet nozzle 5 may reach into the outer tubular wall 3 of the double-wall tube 1 tangentially or radially. An inner diameter of such a coolant inlet nozzle 5 may for example be comprised in a range of 60-125 mm. In the embodiment of FIG. 1, said coolant inlet nozzle 5 is included in a coolant box 2 extending between said outer tubular wall 3 of said coolable double-wall tube 1 and said exterior wall section 11 of said tubular connection member 10 and surrounding said inner tubular wall 4 of said coolable double-wall tube 1. The coolant box 2, with an outer diameter in a range of for instance 110-220 mm, may for example be made of carbon steel, or of an alloy as for example of 1.25Cr-0.5Mo, or of any other suitable material. The coolant box 2 may for example be welded 13 to said outer tubular wall 3 and to said exterior wall section 11, for example via a cylindrical extension 12 of said coolant box 2, or may be connected otherwise. The coolant box 5 may also be fixedly connected, for example welded 13, to the inner tubular wall 4 at a bottom level of said double-wall tube 1. The coolant box 2 may have a reinforced outer shell with a thickness for example in a range of 10-24 mm, which may be thicker than a thickness of the exterior wall section 11 or of the outer tubular wall 3, but this need not be the case.

Figure 2:
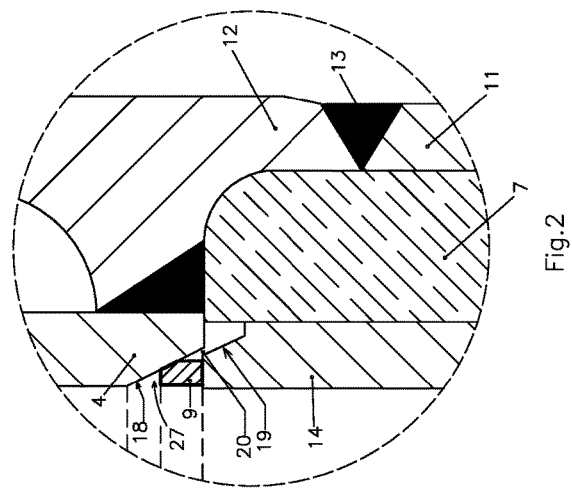
FIG. 2 shows an enlargement of the encircled area in FIG. 1 in an unheated state.
Figure 3:
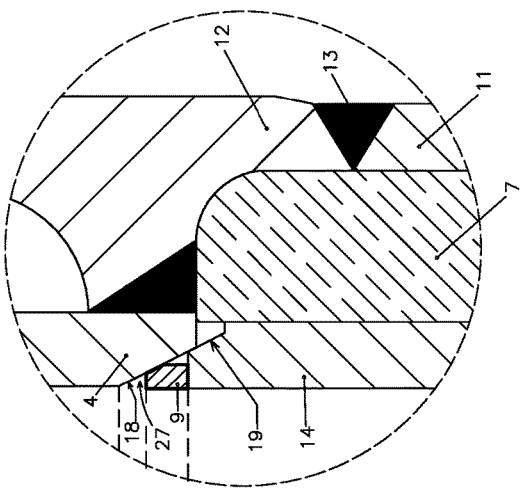
FIG. 3 shows said enlargement of FIG. 2 in a heated state.

FIGS. 2 and 3 show an enlargement of the encircled area in FIG. 1, and representing a more detailed view of the area where the interior wall section 14 of the tubular connection member 10 meets the inner tubular wall 4 of said coolable double-wall tube 1. An axial gap 27 is left between said interior wall section 14 and said inner tubular wall 4 of said coolable double-wall tube 1. The sealing member 9 is configured to seal said axial gap 27 between said interior wall section 14 and said inner tubular wall 4 of said coolable double-wall tube 1 in order to protect the refractory filler material 6, 7 in the intermediate space 21 of the tubular connection member 10 against hot reaction gas leaking into said intermediate space 21 and damaging said refractory filler material 6, 7. With the aim of improving said protective sealing of the intermediate space 21 over all temperature ranges of the cooling process, an edge of said inner tubular wall 4 engaging said sealing member 9 comprises in an inventive way an at least partly bevelled edge including a bevel 18 engaging said sealing member 9. In the preferred embodiment shown in FIGS. 2 and 3, said edge of said inner tubular wall 4 is bevelled radially inwardly, such that the sealing member 9 can be reached from an inside of the tubular connection member 10 and/or from the coolable double-wall tube 1. Also an edge of said interior wall section 14 engaging said sealing member 9 can comprise a partly bevelled edge including a bevel 19 radially spaced apart by a radial gap 20 from, and substantially in parallel with, said at least partly bevelled edge of said end side of said inner tubular wall 4, as shown in FIGS. 2 and 3. Furthermore, the sealing member 9 engages an unbevelled part of said partly bevelled edge of said interior wall section 14 of said tubular connection member 10. In an unheated state of the heat exchanger, depicted in FIG. 2, the intermediate space 21 is thus sealed by the sealing member 9 only. Due to heating caused by the passing of the hot reaction gas to be quenched, the various parts of the heat exchanger will all be expanding, but this thermal expansion is dependent on the proximity and exposure to the hot reaction gas. The interior wall section 14 will for example be axially and radially expanding more than the inner tubular wall 4. The position of the sealing member 9 is therefore going to change slightly during thermal expansion, as shown in FIG. 3: the sealing member 9 will be slightly shifted along the bevel 18 of the inner tubular wall 4, and will also be slightly shifted radially inwardly on the unbevelled part of the partly bevelled edge of said interior wall section 14 of the tubular connection member 10. Due to the radial thermal expansion of the interior wall section 14 of said tubular connection member 10, the bevel 19 of the partly bevelled edge of the tubular connection member 10 will be engaging the bevel 18 of the at least partly bevelled edge of the inner tubular wall 4, thus forming a second protective sealing of the refractory filler material 6, 7 in the intermediate space 21 of the tubular connection member 10.

Figure 4:
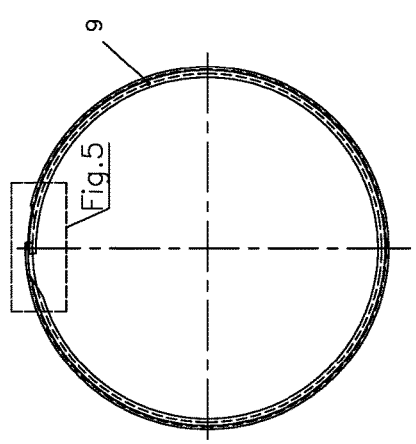
FIG. 4 shows a preferred embodiment of a sealing member of the heat exchanger of FIG. 1.
Figure 5:
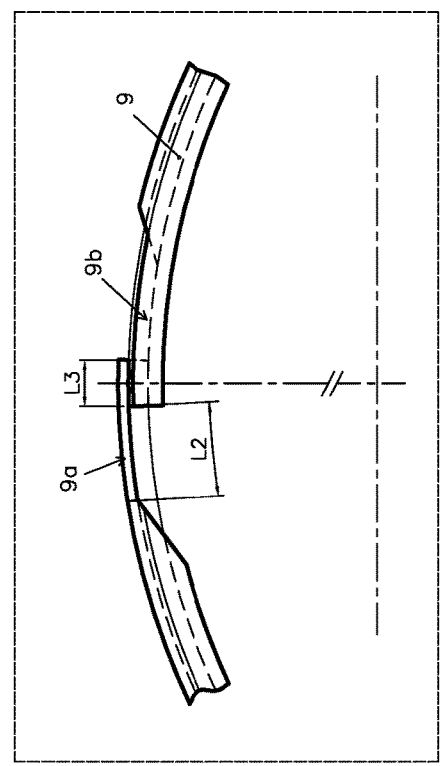
FIG. 5 shows an enlargement of a framed area in FIG. 4.

FIG. 4 shows a preferred embodiment of a sealing member 9 of the heat exchanger of FIG. 1. The sealing member 9 comprises thinned ends 9a, 9b, which can be joint to form a ring structure with slidingly overlapping thinned ends 9a, 9b, shown in more detail in FIG. 5 representing an enlargement of the framed area in FIG. 4. The length of the thinned ends 9a, 9b are arranged to provide a minimal and initial overlap L3 to guarantee a sealing function at the start-up of the cooling process before any thermal expansion takes place. The thinned ends 9a, 9b, in particular the length L2, are also arranged to allow for circumferential thermal expansion of the sealing member 9 itself. Due to the confinement of the sealing member 9 between the coolable double-wall tube 1 and the tubular connection member 10, thermal expansion of the ring will substantially be limited to circumferential expansion. The sealing member 9 preferably also comprises a spring-like element arranged to press said sealing member 9 against said at least partly bevelled edge of said inner tubular wall 4. The sealing member 9 can for instance be made of a high nickel alloy, for example an alloy comprising iron, chromium and nickel, such as UNS N08330 or DIN 1.4886 or any other material known to the person skilled in the art.

Figure 6:
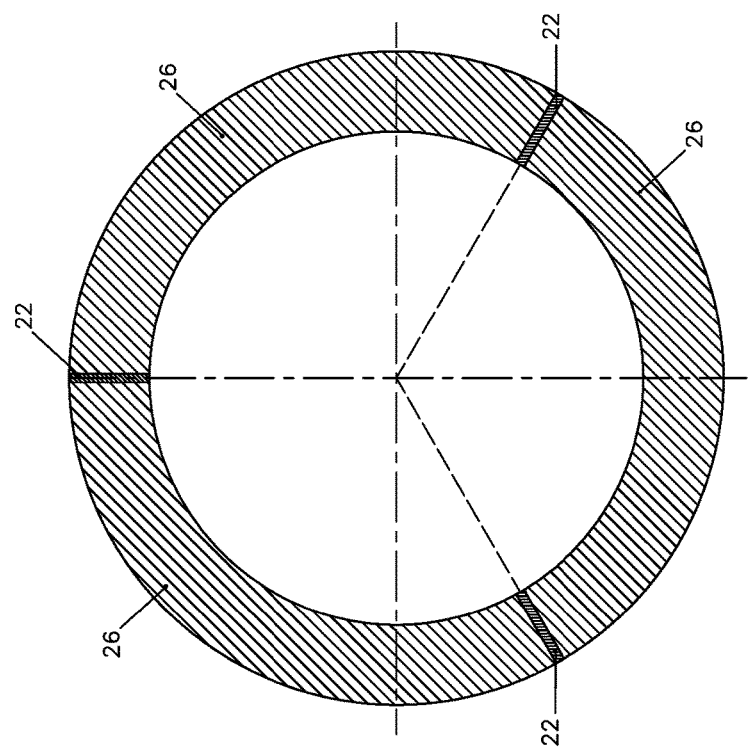
FIG. 6 shows a transverse cross-sectional view according to line X-X in FIG. 1 of the refractory filler material.

FIG. 6 shows a transverse cross-sectional view according to line X-X in FIG. 1 of the refractory filler material 6, 7 in the intermediate space 21 of the tubular connection member 10, the refractory filler material 6, 7 having a thickness in a range of for instance 15-25 mm in a radial direction. As can be seen in FIG. 1, said refractory filler material 6, 7 can comprise in an axial direction at least two layers 6 and 7 of refractory filler material with different heat conductivity. The heat conductivity of said at least two layers of refractory filler material preferably decreases towards said coolable double-wall tube 1. The first layer of refractory filler material 6 may for example be a layer of dense refractory filler material with a high thermal conductivity, for example a layer of silicon carbide or of any other suitable material with a heat conductivity coefficient of for instance 8-12 W/(m$^2$ K), and the second layer may comprise a soft insulating filler 7, for example a layer of Superwool® Plus™, or of any other suitable material with a heat conductivity coefficient of for instance 0.05-0.2 W/(m$^2$ K). In an innovating way, the refractory filler material 6, 7 of the preferred embodiment in FIG. 6 comprises three sectors 26 of refractory filler material separated by three slits 22 extending in an axial and a radial direction. The refractory material may also comprise two or four or more sectors 26 and slits 22. The slits 22 may for example be separated by 180°, 120°, or 90°, or by any other angle. The slits 22 can have a width of for instance 1-2 mm. The sectors 26 may, but need not, be equally partitioned. The at least two slits 22 may for example comprise air, or may comprise a layer of ceramic paper, in order to absorb thermal expansion differences in a radial and circumferential direction between the refractory filler material 6, 7 and a more expanding interior wall section 14 pushing said refractory filler material 6, 7 against a less expanding exterior wall section 11 of said tubular connection member 10. As represented in FIG. 1, a layer of ceramic paper 8 may also be comprised between said refractory filler material 6 and said exterior wall section 11 of said tubular connection member 10. This thin layer of ceramic paper 8, having a thickness of for example 0.5-1.0 mm and a heat conductivity coefficient in a range of for example 0.05-1.0 W/(m$^2$ K), may enclose only part of the refractory filler material, for example only a first axial layer 6 of the refractory filler material, as in FIG. 1, or may encompass the refractory filler material over the entire axial length of the intermediate space 21.

Figure 9:
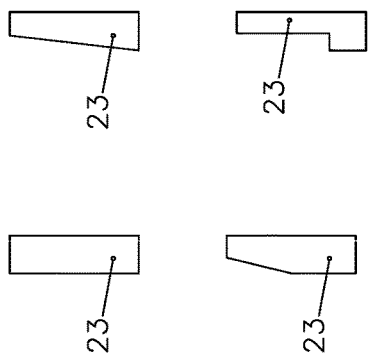
FIG. 9 shows a side view of alternative shapes of a baffle as in FIG. 8.
Figure 8:
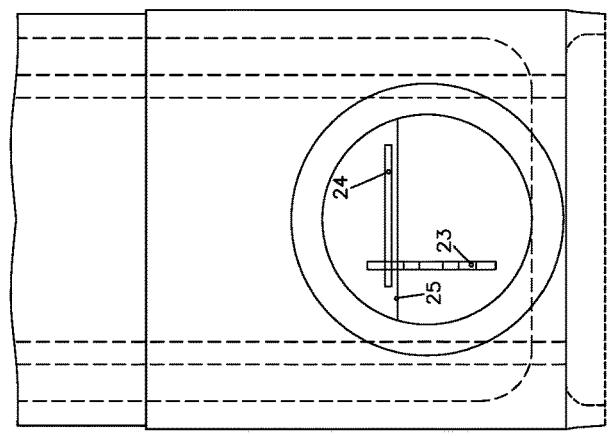
FIG. 8 shows a schematic front view in an axial direction of a coolant inlet nozzle of the heat exchanger of FIG. 1.
Figure 7:
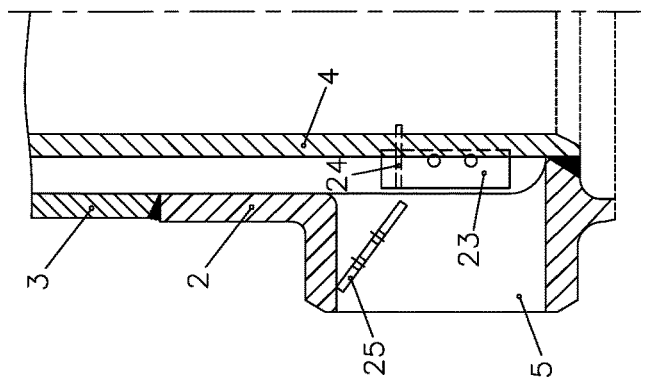
FIG. 7 shows an enlargement of a framed area in FIG. 1.

FIG. 7 shows an enlargement of a framed area in FIG. 1, representing the coolant inlet nozzle 5 arranged to let coolant, for example water, into the space defined by the inner tubular wall 4 and said outer tubular wall 3 of said coolable double-wall tube 1. FIG. 8 shows a schematic front view in an axial direction of the coolant inlet nozzle 5 of the heat exchanger of FIG. 1. In this preferred embodiment, the coolant inlet nozzle 5 is included in a coolant box 2 surrounding said inner tubular wall 4 of said coolable double-wall tube 1. In FIG. 7, the coolant box 2 has a thicker, reinforced outer shell than a thickness of the outer tubular wall 3, but this need not be the case. The heat exchanger comprises at least one baffle 23, 24, 25 arranged to guide a flow of coolant in said space defined by said inner tubular wall 4 and said outer tubular wall 3 of said coolable double-wall tube 1, thus preventing coolant flow stagnation and under deposit corrosion, in particular in an area 28 (see FIG. 1) at a bottom level of the coolable double wall-tube 1 opposite said at least one baffle 23, 24, 25, which area 28 is particularly vulnerable for under deposit corrosion. Said at least one baffle 23, 24, 25 may for example be fixedly connected with an inside of the outer tubular wall 3, or with an inside of the coolant inlet nozzle, as is the case for baffle 25. Preferably, at least one baffle is fixedly connected with an outside of said inner tubular wall 4 of said coolable double-wall tube 1, as are for example baffles 23 and 24. Baffle 25 extends into the coolant inlet nozzle 5 directing coolant towards a bottom level of the coolable double wall-tube 1. Baffles 23 and 24 are located within the coolant space between the outer and the inner tubular walls 3 and 4 and preferably extend into a direction of said coolant inlet nozzle 5. The at least one baffle 23, 24, 25 may for example be a baffle plate, which may include holes or be a closed plate. Baffle plates 23,24, 25 may have a constant or variable height, and may include various shapes, such as rectangular, trapezoidal, partially beveled, or preferably L-shaped baffle plates (see FIG. 9). The at least one baffle may partly extend in a circumferential direction around the inner tubular wall 4, or be limited to a coolant entrance area close to or facing the coolant inlet nozzle 5. The depicted advantageous embodiment of FIGS. 7 and 8 comprises at least two mutually transversally positioned baffles 23 and 24. Baffle 24 is positioned in parallel with a central axis of the coolant inlet nozzle 5 directing coolant to a bottom level of the coolable double wall-tube 1. Baffle 23 is positioned transversally with respect to baffle 24, separating the flow of coolant in a clockwise and an anti-clockwise rotating flow around the inner tubular wall 4. As best seen in FIG. 8, said at least one baffle 23, 24, 25 is preferably off-centered with respect to a central axis of said coolant inlet nozzle 5. The off-centered position of said baffle 23, 24, 25 improves the circulation and thus the efficiency of the coolant around the bottom level of the double-wall tube 1, where coolant is most needed. The at least one baffle 23, 24, 25 can for example be made of carbon steel, or of any other suitable material as known to the person skilled in the art.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. Heat exchanger for quenching reaction gas comprising:
    a coolable double-wall tube including an inner tubular wall and an outer tubular wall, wherein said inner tubular wall is configured to convey said reaction gas to be quenched, and wherein a space defined by said inner tubular wall and said outer tubular wall is configured to convey a coolant;
    a tubular connection member having a bifurcating longitudinal cross-section comprising an exterior wall section and an interior wall section defining an intermediate space filled with refractory filler material, wherein a converging end of said connection member is arranged to be in connection with an uncoolable reaction gas conveying pipe, wherein said exterior wall section is connected with said outer tubular wall of said coolable double-wall tube, wherein an axial gap is left between said interior wall section and said inner tubular wall of said coolable double-wall tube; and
    a sealing member configured to seal said axial gap between said interior wall section and said inner tubular wall of said coolable double-wall tube;
    wherein an edge of said inner tubular wall engaging said sealing member comprises an at least partly beveled edge including a bevel engaging said sealing member.

2. Heat exchanger according to claim 1, wherein said sealing member comprises slidingly overlapping thinned ends.

3. Heat exchanger according to claim 1, wherein said sealing member comprises a spring-like element arranged to press said sealing member against said at least partly beveled edge of said inner tubular wall.

4. Heat exchanger according to claim 1, wherein said edge of said inner tubular wall is beveled radially inwardly.

5. Heat exchanger according to claim 1, wherein an edge of said interior wall section engaging said sealing member comprises a partly beveled edge including a bevel radially spaced apart from, and substantially in parallel with, said at least partly beveled edge of said end side of said inner tubular wall.

6. Heat exchanger according to claim 5, wherein said sealing member engages an unbeveled part of said partly beveled edge of said interior wall section of said tubular connection member.

7. Heat exchanger according to claim 1, wherein said refractory filler material comprises at least two sectors of refractory filler material separated by at least two slits extending in an axial and a radial direction.

8. Heat exchanger according to claim 7, wherein said at least two slits comprise a layer of ceramic paper.

9. Heat exchanger according to claim 1, wherein a layer of ceramic paper is comprised between said refractory filler material and said exterior wall section of said tubular connection member.

10. Heat exchanger according to claim 1, wherein said refractory filler material comprises in an axial direction at least two layers of refractory filler material with different heat conductivity, wherein the heat conductivity of said at least two layers of refractory filler material decreases towards said coolable double-wall tube.

11. Heat exchanger according to claim 1, wherein said outer tubular wall of said coolable double-wall tube is at least partly made of manganese and/or molybdene.

12. Heat exchanger according to claim 1, wherein said coolable double-wall tube comprises a coolant inlet nozzle arranged to let a coolant into said space defined by said inner tubular wall and said outer tubular wall of said coolable double-wall tube at a bottom level of said coolable double-wall tube close to said tubular connection member.

13. Heat exchanger according to claim 12, wherein said coolant inlet nozzle is included in a coolant box extending between said outer tubular wall of said coolable double-wall tube and said exterior wall section of said tubular connection member and surrounding said inner tubular wall of said coolable double-wall tube.

14. Heat exchanger according to claim 1, comprising at least one baffle arranged to guide a flow of coolant in said space defined by said inner tubular wall and said outer tubular wall of said coolable double-wall tube.

15. Heat exchanger according to claim 14, wherein said at least one baffle is fixedly connected with an outside of said inner tubular wall of said coolable double-wall tube.

16. Heat exchanger according to claim 1, wherein said at least one baffle extends into a direction of said coolant inlet nozzle.

17. Heat exchanger according to claim 16, wherein said at least one baffle is off-centered with respect to a central axis of said coolant inlet nozzle.

18. Heat exchanger according to claim 14, comprising at least two mutually transversally positioned baffles.

19. Heat exchanger for quenching reaction gas comprising:
- a coolable double-wall tube including an inner tubular wall and an outer tubular wall, wherein said inner tubular wall is configured to convey said reaction gas to be quenched, and wherein a space defined by said inner tubular wall and said outer tubular wall is configured to convey a coolant;
- a tubular connection member having a bifurcating longitudinal cross-section comprising an exterior wall section and an interior wall section defining an intermediate space filled with refractory filler material, wherein a converging end of said connection member is arranged to be in connection with an uncoolable reaction gas conveying pipe, wherein said exterior wall section is connected with said outer tubular wall of said coolable double-wall tube, wherein an axial gap is left between said interior wall section and said inner tubular wall of said coolable double-wall tube; and
- a sealing member configured to seal said axial gap between said interior wall section and said inner tubular wall of said coolable double-wall tube;

wherein said refractory filler material comprises at least two sectors of refractory filler material separated by at least two slits extending in an axial and a radial direction.

20. Heat exchanger according to claim 19, wherein said at least two slits comprise a layer of ceramic paper.

21. Heat exchanger according to claim 19, wherein a layer of ceramic paper is comprised between said refractory filler material and said exterior wall section of said tubular connection member.

22. Heat exchanger according to claim 19, wherein said refractory filler material comprises in an axial direction at least two layers of refractory filler material with different heat conductivity, wherein the heat conductivity of said at least two layers of refractory filler material decreases towards said coolable double-wall tube.

23. Heat exchanger for quenching reaction gas comprising
- a coolable double-wall tube including an inner tubular wall and an outer tubular wall, wherein said inner tubular wall is configured to convey said reaction gas to be quenched, and wherein a space defined by said inner tubular wall and said outer tubular wall is configured to convey a coolant;
- a tubular connection member having a bifurcating longitudinal cross-section comprising an exterior wall section and an interior wall section defining an intermediate space filled with refractory filler material, wherein a converging end of said connection member is arranged to be in connection with an uncoolable reaction gas conveying pipe, wherein said exterior wall section is connected with said outer tubular wall of said coolable double-wall tube, wherein an axial gap is left between said interior wall section and said inner tubular wall of said coolable double-wall tube;
- a sealing member configured to seal said axial gap between said interior wall section and said inner tubular wall of said coolable double-wall tube; and
- further comprising at least two mutually transversally positioned baffles arranged to guide a flow of coolant in said space defined by said inner tubular wall and said outer tubular wall of said coolable double-wall tube.

24. Heat exchanger according to claim 23, wherein at least one baffle is fixedly connected with an outside of said inner tubular wall of said coolable double-wall tube.

25. Heat exchanger according to claim 23, wherein said coolable double-wall tube comprises a coolant inlet nozzle arranged to let a coolant into said space defined by said inner tubular wall and said outer tubular wall of said coolable double-wall tube at a bottom level of said coolable double-wall tube close to said tubular connection member.

26. Heat exchanger according to claim 23, wherein at least one baffle extends into a direction of said coolant inlet nozzle.

27. Heat exchanger according to claim 26, wherein said at least one baffle is off-centered with respect to a central axis of said coolant inlet nozzle.

\* \* \* \* \*